(12) United States Patent
Akiyama et al.

(10) Patent No.: US 9,459,181 B2
(45) Date of Patent: Oct. 4, 2016

(54) TESTING SYSTEM FOR DRIVE-TRAIN

(71) Applicant: Meidensha Corporation, Tokyo (JP)

(72) Inventors: Takao Akiyama, Tokyo (JP);
Yoshimasa Sawada, Tokyo (JP)

(73) Assignee: MEIDENSHA CORPORATION,
Tokyo (JP)

( * ) Notice: Subject to any disclaimer, the term of this patent is extended or adjusted under 35 U.S.C. 154(b) by 0 days.

(21) Appl. No.: 14/898,402

(22) PCT Filed: Jun. 18, 2014

(86) PCT No.: PCT/JP2014/066108
§ 371 (c)(1),
(2) Date: Dec. 14, 2015

(87) PCT Pub. No.: WO2014/203920
PCT Pub. Date: Dec. 24, 2014

(65) Prior Publication Data
US 2016/0139002 A1 May 19, 2016

(30) Foreign Application Priority Data

Jun. 19, 2013 (JP) ................................. 2013-128204

(51) Int. Cl.
*G01M 17/00* (2006.01)
*G01M 17/007* (2006.01)
(Continued)

(52) U.S. Cl.
CPC ......... *G01M 17/007* (2013.01); *G01M 13/025* (2013.01); *B60C 23/061* (2013.01); *B60C 99/006* (2013.04); *G01L 3/02* (2013.01); *G01L 3/24* (2013.01); *G01L 5/26* (2013.01); *G01M 15/044* (2013.01)

(58) Field of Classification Search
CPC ............ G01M 15/044; G01M 17/007; B60C 23/061; B60C 99/006; G01L 3/02; G01L 3/24; G01L 5/26
USPC ........................................ 73/116.05, 116.06
See application file for complete search history.

(56) References Cited

U.S. PATENT DOCUMENTS 6,754,615 B1 * 6/2004 Germann ................ B60C 19/00
701/36
7,610,799 B2 * 11/2009 Sugita ................ F02D 41/1497
73/114.15
(Continued)

FOREIGN PATENT DOCUMENTS

JP    10-176978    6/1998
JP    2011002454   1/2001
(Continued)

*Primary Examiner* — Freddie Kirkland, III
(74) *Attorney, Agent, or Firm* — Muncy, Geissler, Olds & Lowe, P.C.

(57) ABSTRACT

Provided is a testing system which is able to reproduce road surfaces in different states between both right and left tires. A testing system is provided with: a tire speed calculation unit which calculates virtual left and right tire speed values; a vehicle speed calculation unit which calculates a virtual vehicle speed value; a vehicle drive torque calculation unit which calculates left and right vehicle drive torque values; a differential torque calculation unit which calculates left and right differential torque values; and a speed control device which outputs a torque current command signal such that a deviation between a speed command value and a value detected by an encoder is eliminated. The tire speed calculation unit calculates the tire speed value on the basis of the differential torque values and the vehicle drive torque values.

18 Claims, 8 Drawing Sheets

(51) Int. Cl.
   *G01M 13/02*   (2006.01)
   *B60C 23/06*   (2006.01)
   *B60C 99/00*   (2006.01)
   *G01L 3/02*   (2006.01)
   *G01L 3/24*   (2006.01)
   *G01L 5/26*   (2006.01)
   *G01M 15/04*   (2006.01)

(56) References Cited

U.S. PATENT DOCUMENTS

| | | | | |
|---|---|---|---|---|
| 8,006,548 | B2* | 8/2011 | Akiyama | G01M 15/02 |
| | | | | 73/116.05 |
| 8,434,352 | B2* | 5/2013 | Dank | G01M 15/02 |
| | | | | 73/116.04 |
| 8,590,369 | B2* | 11/2013 | Johnson | G01M 15/02 |
| | | | | 73/116.06 |
| 8,631,693 | B2* | 1/2014 | Johnson | G01M 17/0074 |
| | | | | 73/116.05 |
| 8,689,618 | B2* | 4/2014 | Engstrom | G01M 17/0074 |
| | | | | 73/114.13 |
| 9,116,062 | B2* | 8/2015 | Akiyama | G01L 3/24 |
| 9,207,149 | B2* | 12/2015 | Kanke | G01M 13/025 |
| 9,234,820 | B2* | 1/2016 | Akiyama | G01M 13/025 |
| 2011/0041595 | A1 | 2/2011 | Dank et al. | |

FOREIGN PATENT DOCUMENTS

| | | |
|---|---|---|
| JP | 2005-061889 | 3/2005 |
| JP | 2006-184041 | 7/2006 |
| JP | 2009-074834 | 4/2009 |
| JP | 2011-107051 | 6/2011 |

* cited by examiner

TESTING SYSTEM FOR DRIVE-TRAIN

TECHNICAL FIELD

The present invention relates to a drive train testing system.

BACKGROUND ART

A drive train generally corresponds to a plurality of devices used to transmit energy generated by an engine to drive wheels, and includes an engine, a clutch, a transmission, a drive shaft, a propeller shaft, a differential gear, and drive wheels. In a drive train testing system, the durability performance or the quality of a drive train is evaluated while an appropriate load torque is applied to an output shaft in a manner so that the transmission is actually driven by an engine and a dynamometer connected to an output shaft thereof is subjected to an electric inertia control.

In many cases, in the electric inertia control employed in such a testing system, only a single inertia amount corresponding to a vehicle inertia moment can be set as shown in, for example, Patent Document 1. This simulation model is assumed under the condition that the vehicle normally travels on a road surface while a tire actually grips the road surface without any slip. However, in reality, there are road surface conditions, such as a snowy surface or an icy surface on which the tire easily slips. In the testing system shown in Patent Document 1, it is difficult to reproduce a state in which the tire slips on such a road surface.

Patent Document 2 discloses a technique for calculating load torque based on a dynamic characteristic model of a vehicle equipped with a drive train. The dynamic characteristic model includes a slip model that calculates the longitudinal force acting on the vehicle based on the slip ratio of the tire and the perpendicular load acting on the vehicle. Accordingly, a load torque is generated by a dynamometer in consideration of the slip behavior of the tire.

[Patent Document 1] Japanese Unexamined Patent Application, Publication No. 2009-74834

[Patent Document 2] Japanese Unexamined Patent Application, Publication No. 2005-61889

DISCLOSURE OF THE INVENTION

Problems to be Solved by the Invention

Incidentally, the above-described testing system is classified into various types depending on the test object. For example, in the testing system of Patent Document 2, a test piece including a differential gear is a test object. Here, the testing system, from its appearance, is called a T-shape in that a pair of output shafts of the differential gear and two dynamometers are coaxially fixed. In this way, in the T-shaped testing system including two dynamometers, different road surfaces for both left and right tires can be reproduced in a manner so that the dynamometers are independently driven.

Other than the T-shaped testing system, an I-shaped testing system is also known in which a test piece not including a differential gear is the test object. In the I-shaped testing system, an engine, a propeller shaft, and the dynamometer of the test piece are disposed in series so that the dynamometer is fixed to be coaxial with the propeller shaft. Incidentally, in the I-shaped testing system, since only one dynamometer is used, contrary to the T-shaped testing system, it is not possible to reproduce different road surfaces for both left and right tires by directly applying the technique of Patent Document 2 as the T-shaped testing system.

An object of the invention is to provide a testing system capable of reproducing different road surfaces for both left and right tires even in a so-called I-shaped drive train testing system in which a test piece not including a differential gear is the test object.

Means for Solving the Problems (1) In order to attain the above-described object, the invention provides a drive train testing system (for example, testing systems 1, 1A, and 1B to be described later) including: a dynamometer (for example, a dynamometer 2 to be described later) that is connected to an output shaft (for example, a propeller shaft S to be described later) of a test piece; an inverter (for example, an inverter 3 to be described later) that supplies electric power in response to a command signal to the dynamometer; an axial torque detector (for example, an axial torque meter 5 to be described later) that detects an axial torque acting on the output shaft; a speed detector (for example, an encoder 4 to be described later) that detects a rotation speed of the dynamometer; a tire speed calculation unit (for example, tire speed calculation units 62L, 62R, 62LB, and 62RB to be described later) that calculates a speed value (for example, a left tire speed value Vwl to be described later) of a first tire and a speed value (for example, a right tire speed value Vwr to be described later) of a second tire respectively connected to a pair of output shafts of a virtual differential device connected to the output shaft of the test piece; a vehicle speed calculation unit (for example, a vehicle speed calculation unit 64 to be described later) that calculates a speed value (for example, a vehicle speed value V to be described below) of a virtual vehicle traveling by using the first and second tires as drive wheels; a vehicle driving torque calculation unit (for example, vehicle driving torque calculation units 63L and 63R to be described later) that calculates a first vehicle driving torque value (for example, a left vehicle driving torque value Fxl to be described later) obtained from a friction force between the first tire and a virtual first road surface and a second vehicle driving torque value (for example, a right vehicle driving torque value Fxr to be described later) obtained from a friction force between the second tire and a virtual second road surface based on the first and second tire speed values and the vehicle speed value; a differential torque calculation unit (for example, differential torque calculation units 61 and 61A to be described later) that calculates a first differential torque value (for example, a left differential torque value Tdl to be described later) and a second differential torque value (for example, a right differential torque value Tdr to be described later) respectively generated in the pair of output shafts of the differential device based on a detection value of the axial torque detector; and a speed control device (for example, a speed control device 65 to be described later) that outputs a command signal so that a deviation between a detection value of the speed detector and a speed command value calculated based on the first and second tire speed values disappears, wherein the tire speed calculation unit calculates the first tire speed value based on the first differential torque value and the first vehicle driving torque value and calculates the second tire speed value based on the second differential torque value and the second vehicle driving torque value.

(2) In this case, the differential torque calculation unit may calculate the first differential torque value and the second differential torque value by multiplying the detection value of the axial torque detector by a predetermined first torque distribution ratio (for example, a left torque distribution ratio Rl to be described later) and a second torque distribution ratio (for example, a right torque distribution ratio Rr to be described later) so as to simulate a torque distribution function of the differential device.

(3) In this case, the differential torque calculation unit may calculate the first differential torque value by multiplying the detection value of the axial torque detector by the first torque distribution ratio and a predetermined gear ratio (for example, a gear ratio Gd to be described later) of the differential device, and may calculate the second differential torque value by multiplying the detection value of the axial torque detector by the second torque distribution ratio and the gear ratio.

(4) In this case, the speed control device may set a value obtained by multiplying an average value of the first tire speed value and the second tire speed value by a predetermined gear ratio of the differential device as a speed command value.

(5) In this case, the testing system (for example, a testing system 1A to be described later) may further include: a braking device (for example, a braking device 7A to be described later) that decelerates a rotation of the output shaft of the test piece; and a decelerating torque calculation unit (for example, a decelerating torque calculation unit 67A to be described later) that calculates a decelerating torque value (for example, a decelerating torque value DB_Trq to be described later) of the output shaft based on the detection value of the axial torque detector, the detection value of the speed detector, and a value of a command signal to the inverter.

(6) In this case, the testing system may further include: a first braking torque calculation unit (for example, left braking torque calculation units 68LB and 68LC to be described later) that calculates a first braking torque value (for example, a left braking torque value DBl to be described later) generated in the first tire side of the output shaft in the differential device by a virtual braking device; and a second braking torque calculation unit (for example, a right braking torque calculation unit 68RB to be described later) that calculates a second braking torque value (for example, a right braking torque value DBr to be described later) generated in the second tire side of the output shaft in the differential device by the braking device, wherein the tire speed calculation unit may calculate the first tire speed value based on a value obtained by subtracting the first vehicle driving torque value and the first braking torque value from the first differential torque value and may calculate the second tire speed value based on a value obtained by subtracting the second vehicle driving torque value and the second braking torque value from the second differential torque value, wherein the first braking torque calculation unit may set a predetermined braking torque command value (for example, a braking torque command value DB_ref to be described later) as an upper limit value and may calculate the first braking torque value so that the first braking torque value is smaller than the upper limit value and the first tire speed value becomes 0, and wherein the second braking torque calculation unit may set a predetermined braking torque command value (for example, a braking torque command value DB_ref to be described later) as an upper limit value and may calculate the second braking torque value so that the second braking torque value is smaller than the upper limit value and the second tire speed value becomes 0.

(7) In this case, the first braking torque calculation unit may limit the braking torque command value at a predetermined change rate or less, may set the limited first braking torque value as an upper limit value, and may calculate the first braking torque value so that the first braking torque value is smaller than the upper limit value and the first tire speed value becomes 0, and the second braking torque calculation unit may limit the braking torque command value at a predetermined change rate or less, may set the limited second braking torque value as an upper limit value, and may calculate the second braking torque value so that the second braking torque value is smaller than the upper limit value and the second tire speed value becomes 0.

Effects of the Invention (1) In the testing system of the invention, the speed values of the virtual first and second tires connected through the virtual differential device are calculated by the tire speed calculation unit, and the command signal to the inverter is determined by the speed control device so that the rotation speed of the dynamometer matches the command value calculated based on the first and second tire speed values. Furthermore, in the invention, the first differential torque value and the second differential torque value respectively generated in the pair of output shafts of the virtual differential device are calculated based on the detection value of the axial torque detector by the differential torque calculation unit so as to simulate the function of the virtual differential device. Then, the first tire speed value and the second tire speed value as the command values to the speed control device are calculated by simultaneously obtaining three virtual physical amounts for each of the first tire side and the second tire side through the calculation of the first and second tire speed values using the tire speed calculation unit, the calculation of the virtual vehicle speed value using the vehicle speed calculation unit, and the calculation of the virtual first and second vehicle driving torque values using the vehicle driving torque calculation unit based on the first and second differential torque values obtained from the single axial torque detector as input. Accordingly, in the invention, it is possible to reproduce different road surfaces for both the left and right tires by performing a separate calculation for the virtual first tire and the virtual second tire even in the I-shaped testing system in which the test piece not including the differential device is the test object.

(2) In the invention, the first and second differential torque values are calculated by multiplying the detection value of the axial torque detector by the first and second torque distribution ratios so as to simulate the torque distribution function of the differential device. Accordingly, it is possible to simulate the function of the virtual differential device in more detail.

(3) In the invention, the first differential torque value is calculated by multiplying the detection value of the axial torque detector by the first torque distribution ratio and the gear ratio and the second differential torque value is calculated by multiplying the detection value of the axial torque detector by the second torque distribution ratio and the gear ratio so as to simulate the deceleration function of the differential device. Accordingly, it is possible to simulate the function of the virtual differential device in more detail.

(4) In the invention, an average value of the first tire speed value and the second tire speed value calculated separately as described above is calculated, and a value obtained by multiplying the average by the gear ratio of the differential device is set as the speed command value, thereby controlling the speed of the dynamometer by the speed control device using the speed command value. Accordingly, it is possible to reproduce different road surfaces for both left and right tires even in the I-shaped testing system only including a single dynamometer.

(5) The braking device for decelerating the rotation of the output shaft of the test piece is provided in the invention, and the decelerating torque value obtained by the operation of the braking device is estimated based on the detection value of the axial torque detector, the detection value of the speed detector, and the value of the command signal to the inverter. Accordingly, since it is possible to reproduce a behavior even during the operation of the braking device, it is possible to further improve the reproducibility of the test.

(6) According to the invention, the first and second braking torque calculation units respectively calculate the first and second braking torque values generated in the pair of shafts of the virtual differential device by the operation of the virtual braking device. The tire speed calculation unit calculates the tire speed value based on a value obtained by subtracting the vehicle driving torque value and the braking torque value from the differential torque value. Accordingly, it is possible to reproduce a behavior during the operation of the brake even when the mechanical brake is not provided in the test piece differently from the invention (5). Furthermore, in the invention, the braking torque calculation unit treats the predetermined braking torque command value as the upper limit value without directly inputting the predetermined braking torque command value to the tire speed calculation unit. That is, the braking torque calculation unit sets the braking torque command value as the upper limit value, and calculates the braking torque value so that the braking torque value is smaller than the upper limit value and the tire speed value calculated by the tire speed calculation unit becomes 0. Accordingly, when the braking torque command value is set to be large or small, the I-shaped testing system can very precisely reproduce a behavior until the vehicle is stopped in the virtual traveling state when the brake is intensely operated or is weakly operated. In other words, it is possible to reproduce a behavior when the traveling vehicle is stopped in a short time by the intense braking operation or a behavior when the traveling vehicle is stopped in a long time by the weak braking operation.

(7) According to the invention, the braking torque calculation unit limits the braking torque command value at a predetermined change rate or less. Then, the braking torque value is calculated so that the braking torque value is smaller than the upper limit value as the limited braking torque value and the tire speed value becomes 0. Accordingly, when the change rate is set to be large or small, it is possible to very precisely reproduce a behavior until the vehicle is stopped in the virtual traveling state when the braking device is suddenly and intensely operated or is smoothly operated.

PREFERRED MODE FOR CARRYING OUT THE INVENTION

First Embodiment

A drive train testing system 1 according to a first embodiment of the invention will be described with reference to the drawings.

Figure 1:
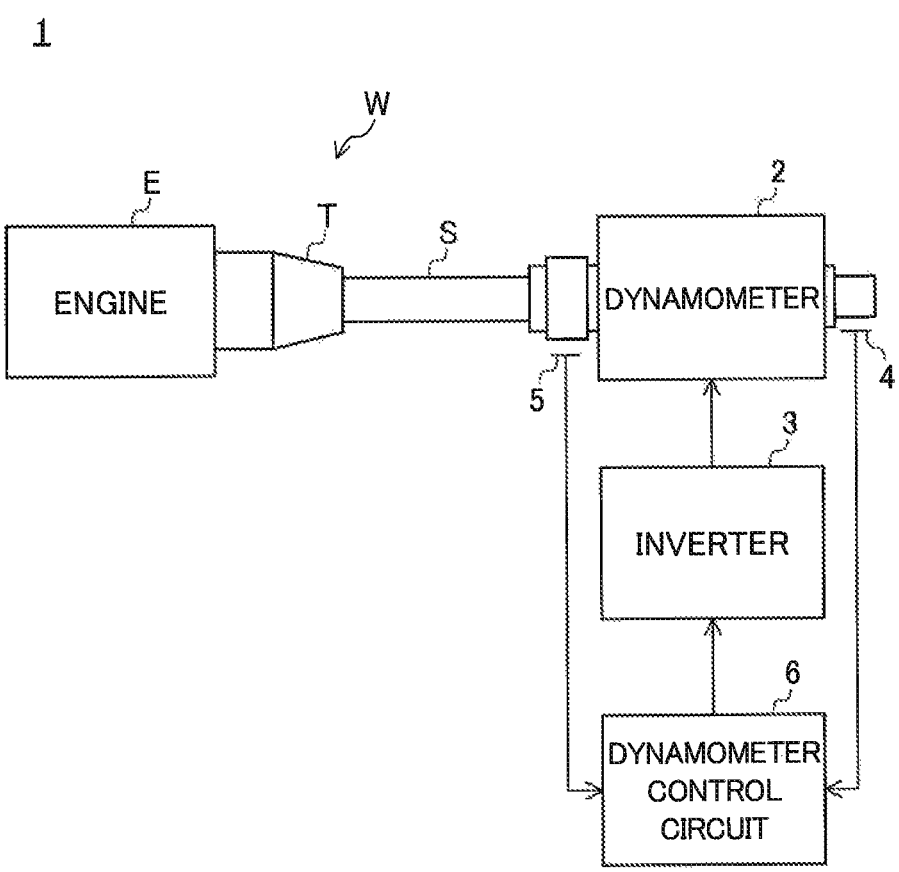
FIG. 1 is a schematic diagram illustrating the configuration of a drive train testing system according to a first embodiment of the invention.

FIG. 1 is a schematic diagram illustrating the configuration of the testing system 1 of the embodiment. As shown in FIG. 1, the testing system 1 is a so-called I-shaped system that uses a drive train including an engine E, a transmission T, and a propeller shaft S and not including a differential gear (a differential device) as a test piece W.

The testing system 1 includes a dynamometer 2 coaxially connected to a propeller shaft S, an inverter 3 supplying electric power to the dynamometer 2, an encoder 4 detecting a rotation speed of the dynamometer 2, an axial torque meter 5 detecting an axial torque of the propeller shaft S, a dynamometer control circuit 6 controlling the dynamometer 2 based on output signals of the encoder 4 and the axial torque meter 5, and an engine control device (not shown) controlling the engine E. In the testing system 1, the durability performance or the quality of the test piece W is evaluated while an appropriate load torque is applied to the propeller shaft S in a manner so that the propeller shaft S is rotationally driven by the engine E and the dynamometer 2 connected to the propeller shaft S is subjected to an electric inertia control by the dynamometer control circuit 6.

The inverter 3 supplies electric power in response to a torque current command signal output from the dynamometer control circuit 6 to the dynamometer 2. The encoder 4 detects a rotation speed of the dynamometer 2 and transmits a signal substantially proportional to a detection value to the dynamometer control circuit 6. The axial torque meter 5 detects an axial torque acting on the dynamometer 2 side of the propeller shaft S from, for example, a strain amount in a shaft twist direction, and transmits a signal substantially proportional to a detection value to the dynamometer control circuit 6.

Figure 2:
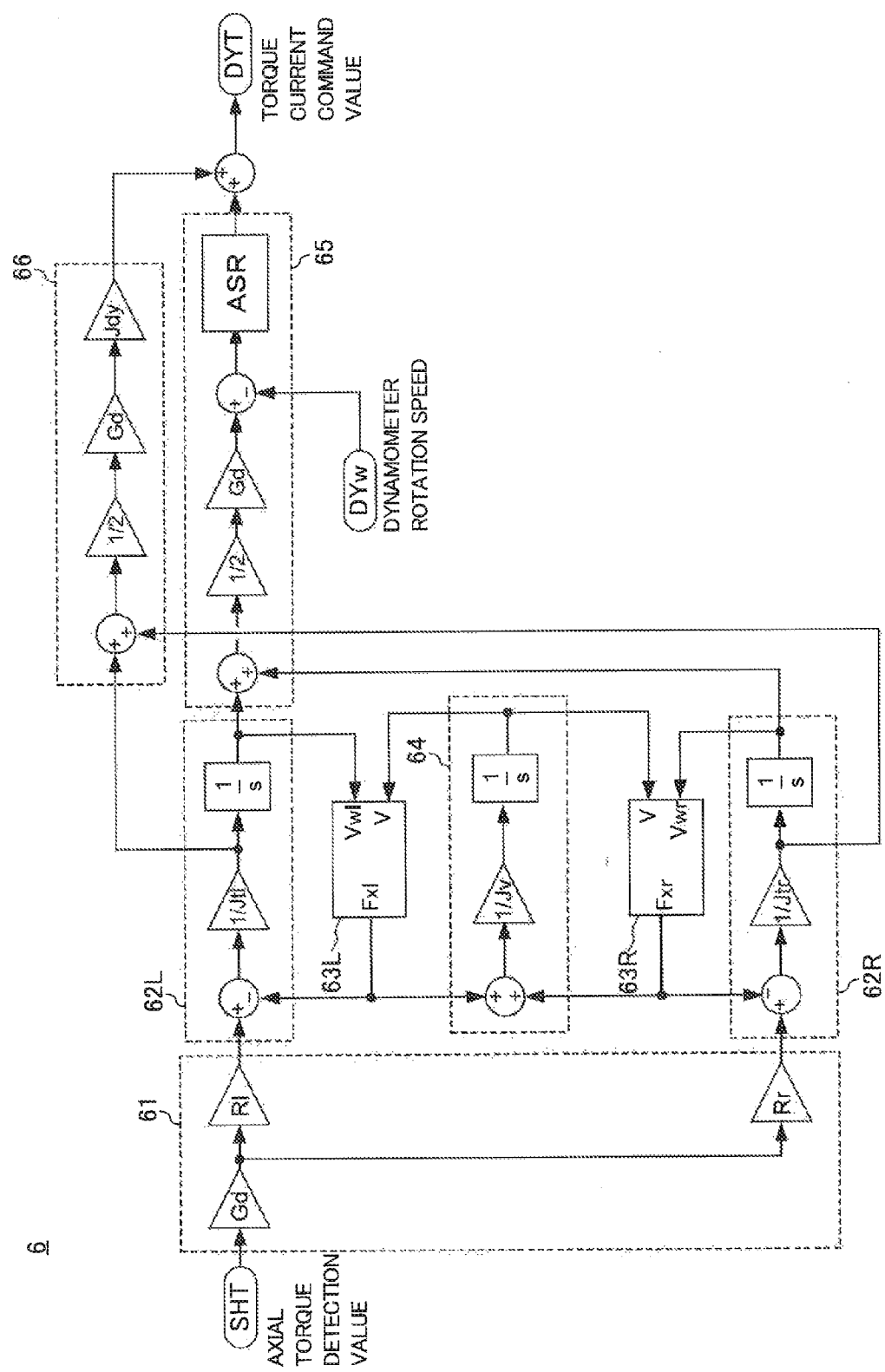
FIG. 2 is a block diagram illustrating the configuration of a dynamometer control circuit according to the above-described embodiment.

FIG. 2 is a block diagram illustrating the configuration of the dynamometer control circuit 6.

The dynamometer control circuit 6 includes a differential torque calculation unit 61, a left tire speed calculation unit 62L, a right tire speed calculation unit 62R, a left vehicle driving torque calculation unit 63L, a right vehicle driving torque calculation unit 63R, a vehicle speed calculation unit 64, a speed control device 65, and a feed forward input calculation unit 66.

The differential torque calculation unit 61 calculates a left differential torque value Tdl and a right differential torque value Tdr respectively generated in a pair of output shafts of a differential gear based on a detection value SHT of a single axial torque meter by simulating a deceleration function and a torque distribution function of a virtual differential gear.

The left differential torque value Tdl is calculated by multiplying a predetermined gear ratio Gd and a predetermined left torque distribution ratio Rl by a detection value SHT of the axial torque meter (see the following equation (1)). Furthermore, the right differential torque value Tdr is calculated by multiplying a gear ratio Gd and a predetermined right torque distribution ratio Rr by the detection value SHT of the axial torque meter (see the following equation (2)). Here, the values of the left torque distribution ratio Rl and the right torque distribution ratio Rr are respectively set in the range of 0 to ½. Hereinafter, a relation of Rl=Rr=½ is employed.

$$Tdl = SHT \times Gd \times Rl \tag{1}$$

$$Tdr = SHT \times Gd \times Rr \tag{2}$$

The vehicle speed calculation unit 64 calculates a vehicle speed value V corresponding to a vehicle speed from a vehicle motion equation (see the following equation (3)) characterized by an inertia moment Jv of a virtual vehicle traveling using virtual left and right tires as drive wheels using a left vehicle driving torque value Fxl to be described later corresponding to a vehicle driving force generated by a friction force between a virtual left road surface and the virtual left tire connected to one output shaft of the differential gear and a right vehicle driving torque value Fxr to be described later corresponding to a vehicle driving force generated by a friction force between a virtual right road surface and the virtual right tire connected to the other output shaft of the differential gear, as input.

$$Fxl + Fxr = Jv \cdot dV/dt \tag{3}$$

The left tire speed calculation unit 62L calculates a left tire speed value Vwl corresponding to a left tire rotation speed from a left tire motion equation (see the following equation (4)) characterized by an inertia moment Jtl of the left tire using the left vehicle driving torque value Fxl and the left differential torque value Tdl calculated by the differential torque calculation unit 61 as input.

$$Tdl - Fxl = Jtl \cdot dVwl/dt \tag{4}$$

More specifically, the left tire speed calculation unit 62L defines a value obtained by subtracting the left vehicle driving torque value Fxl from the left differential torque value Tdl as a left tire driving torque value contributing to the rotation of the left tire, multiplies the inverse number of the left tire inertia moment Jtl by the left tire driving torque value, and integrates the result so as to obtain the left tire speed value Vwl.

The right tire speed calculation unit 62R calculates a right tire speed value Vwr corresponding to a right tire rotation speed from a right tire motion equation (see the following equation (5)) characterized by an inertia moment Jtr of the right tire using the right vehicle driving torque value Fxr and the right differential torque value Tdr calculated by the differential torque calculation unit 61 as input. Since a specific procedure of calculating the right tire speed value Vwr is similar to the procedure of calculating the left tire speed value Vwl, the detailed description will be omitted.

$$Tdr - Fxr = Jtr \cdot dVwr/dt \tag{5}$$

The left vehicle driving torque calculation unit 63L calculates the left vehicle driving torque value Fxl corresponding to a vehicle driving force generated by the friction force between the left tire and the virtually set left road surface based on a difference between the left tire speed value Vwl and the vehicle speed value V. Hereinafter, the procedure will be described in detail.

Figure 3:
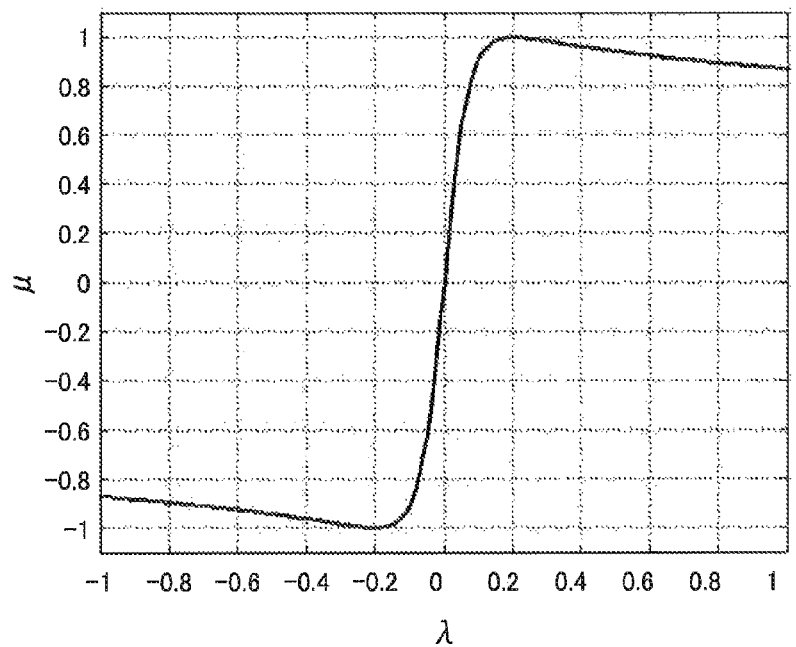
FIG. 3 is a diagram illustrating an example of a control map for determining a friction coefficient value between a tire and a road surface.

The left vehicle driving torque calculation unit 63L first calculates a left slip ratio λl of the left tire on the left road surface by the following equation (6) based on one of the speed values Vwl and V, whichever is larger, and the speed difference (Vwl−V). Next, the left vehicle driving torque calculation unit 63L determines a left friction coefficient value μl between the left tire and the left road surface based on a control map fl shown in FIG. 3 using the calculated left slip ratio λl as a factor (see the following equation (7)). In addition, the control map for determining the friction coefficient value can be appropriately selected in response to the state of the left road surface (a snowy surface, a dry road surface, or the like). Next, the left vehicle driving torque calculation unit 63L calculates the left vehicle driving torque value Fxl by multiplying a left perpendicular drag value Nzl applied from the left road surface to the left tire by the left friction coefficient value μa (see the following equation (8)). A predetermined integer or a value estimated in response to the vehicle speed value V is used as the left perpendicular drag value Nzl.

$$\lambda l = (Vwl - V)/\max(Vwl, V) \tag{6}$$

$$\mu l = fl(\lambda l) \tag{7}$$

$$Fxl = Nzl \cdot \mu l \tag{8}$$

The right vehicle driving torque calculation unit 63R calculates the right vehicle driving torque value Fxr corresponding to a vehicle driving force generated by a friction force between the right tire and the right road surface by the following equations (9) to (11) based on the right tire speed value Vwr and the vehicle speed value V as input. Since a specific procedure of calculating the right vehicle driving torque value Fxr is similar to the procedure of calculating the left vehicle driving torque value Fxl, the detailed description will be omitted.

$$\lambda r = (Vwr - V)/\max(Vwr, V) \tag{9}$$

$$\mu r = fr(\lambda r) \tag{10}$$

$$Fxr = Nzr \cdot \mu r \tag{11}$$

As described above, the left tire and the right tire respectively connected to both ends of the pair of output shafts through the virtual differential gear and the vehicle traveling on the left road surface and the right road surface using these tires as the drive wheels are virtually set in the dynamometer control circuit 6, these tires and the vehicle are set as independent objects respectively having the inertia moments Jtl, Jtr, and Jv, and the motion equations (3) to (11) thereof are simultaneously used to calculate the vehicle speed value V, the left tire speed value Vwl, and the right tire speed value Vwr. Furthermore, in the dynamometer control circuit 6, the function of the virtual differential gear is simulated so as to calculate the left and right differential torque values Tdl and Tdr from the detection value of the axial torque meter (see the equations (1) and (2)), and these differential torque values Tdl and Tdr are input to the left and right tire speed calculation units 62L and 62R so as to calculate the left and right tire speed values Vwl and Vwr.

The speed control device 65 sets a virtual tire speed value obtained by multiplying the gear ratio Gd of the differential gear by the average value of the left tire speed values Vwl and Vwr calculated by the left and right tire speed calculation units 62L and 62R as a speed command value, and outputs a torque current command signal so that the detection value of the encoder becomes the speed command value.

The feed forward input calculation unit 66 corrects the torque current command signal by synthesizing a signal proportional to a difference between the vehicle driving torque values Fxl and Fxr and the differential torque values Tdl and Tdr with the torque current command signal output from the speed control device 65. More specifically, as shown in FIG. 2, the feed forward input calculation unit 66 calculates an average value of a value obtained by multiplying the inverse number of the inertia moment Jtl of the left tire by a difference between the left differential torque value Tdl and the left vehicle driving torque value Fxl and a value obtained by multiplying the inverse number of the inertia moment Jtr of the right tire by a difference between the right differential torque value Tdr and the right vehicle driving torque Fxr. Furthermore, the feed forward input calculation unit 66 multiplies the average value by the gear ratio Gd and the inertia moment Jdy of the dynamometer, and synthesizes the result with the torque current command signal output from the speed control device 65. By the function of such a feed forward input calculation unit 66, it is possible to improve the responsiveness to a change in tire speed values Vwl and Vwr.

Figure 4:
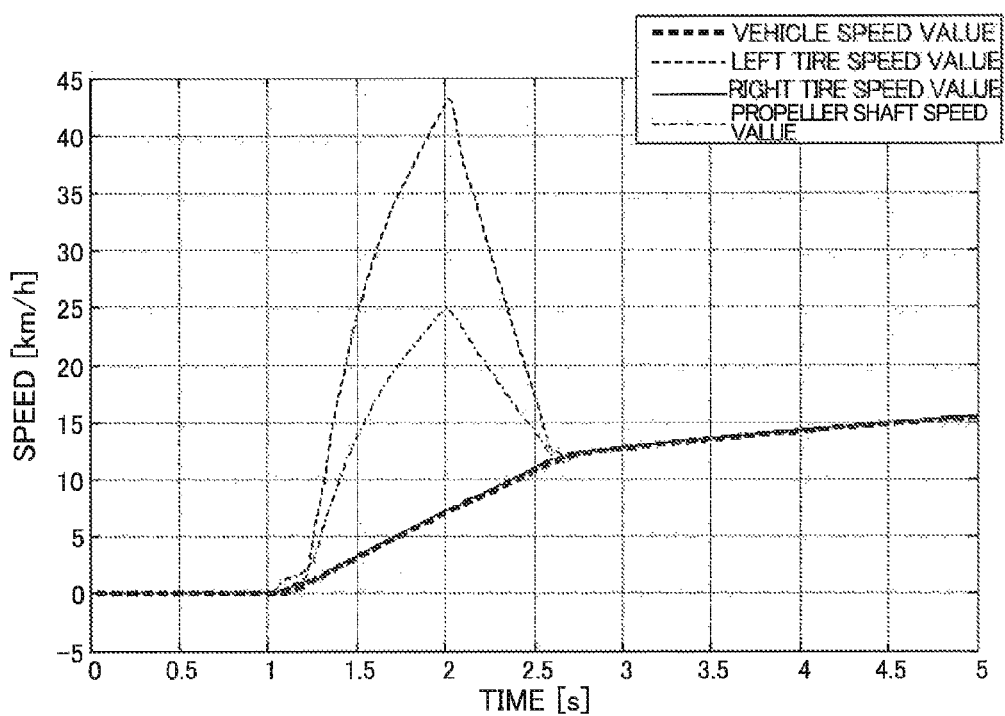
FIG. 4 is a diagram illustrating an example of a change in vehicle speed value, a change in left tire speed value, a change in right tire speed value, and a change in propeller shaft speed value.

FIG. 4 is a diagram illustrating an example of a change in vehicle speed value V, a change in left tire speed value Vwl, a change in right tire speed value Vwr, and a change in propeller shaft speed value (corresponding to the detection value of the encoder). FIG. 4 illustrates an example of a change in speed value when an accelerator pedal is stepped on intensely at the time t1 from the vehicle stop state so as to suddenly accelerate the engine E and then a stepping force on the accelerator pedal is weakened at the time t2. In addition, in the result shown in FIG. 4, the left road surface is set to be more slippery than the right road surface in the setting of the virtual road surface. That is, the friction coefficient value in the control map fl used for the left vehicle driving torque calculation unit 63L is set to be larger than that of the control map fr used for the right vehicle driving torque calculation unit 63R.

As shown in FIG. 4, when the engine E is suddenly accelerated at the time t1, the left tire speed value (a thin broken line) rises remarkably compared to the vehicle speed value (a thick broken line), and the right tire speed value (a thin solid line) changes substantially similarly to the vehicle speed value. Furthermore, when a stepping force on the accelerator pedal is weakened at the time t2, the vehicle speed value rises and the left tire speed value falls. Then, at the time t3, the left tire speed value, the right tire speed value, and the vehicle speed value are substantially equal to one another. As described above, according to the testing system of the embodiment, since the left differential torque value Tdl and the right differential torque value Tdr are calculated based on the detection value of the axial torque meter and the left tire speed value Vwl and the right tire speed value Vwr are separately calculated, it is possible to simulate a starting operation and a traveling operation using both left and right tires on different road surfaces even in the I-shaped testing system.

According to the testing system of the embodiment, the following effects (A) to (C) are obtained.

(A) In the testing system 1, the differential torque calculation unit 61 calculates the left and right differential torque values Tdl and Tdr respectively generated in the pair of output shafts of the virtual differential gear based on the detection value SHT of the axial torque meter in order to simulate the function of the virtual differential gear. Then, the left and right tire speed values Vwl and Vwr as the command values to the speed control device 65 are calculated by simultaneously obtaining three virtual physical amounts for each of the left tire and the right tire through the calculation of the left and right tire speed values Vwl and Vwr using the tire speed calculation units 62L and 62R, the calculation of the virtual vehicle speed value V using the vehicle speed calculation unit 64, and the calculation of the virtual left and right vehicle driving torque values Fxl and Fxr using the vehicle driving torque calculation units 63L and 63R based on the left and right differential torque values Tdl and Tdr obtained from a single axial torque meter as input. Accordingly, in the testing system 1, it is possible to simulate a starting operation and a traveling operation using both left and right tires on different road surfaces.

(B) In the testing system 1, the torque distribution function and the deceleration function of the differential gear are simulated so that a value obtained by multiplying the left torque distribution ratio Rl and the gear ratio Gd by the detection value SHT of the axial torque meter is set as the left differential torque value Tdl and a value obtained by multiplying the right torque distribution ratio Rr and the gear ratio Gd by the detection value SHT of the axial torque meter is set as the right differential torque value Tdr. Accordingly, the function of the virtual differential gear can be simulated in more detail.

(C) In the testing system 1, an average value of the left and right tire speed values Vwl and Vwr separately calculated as described above is calculated and a value obtained by multiplying the average value by the gear ratio Gd of the differential gear is set as the speed command value, thereby controlling the speed of the dynamometer by the speed control device 65. Accordingly, even in the I-shaped testing system 1 only including a single dynamometer, it is possible to simulate a starting operation and a traveling operation using both left and right tires on different road surfaces.

Second Embodiment

A drive train testing system 1A according to a second embodiment of the invention will be described with reference to the drawings.

Figure 5:
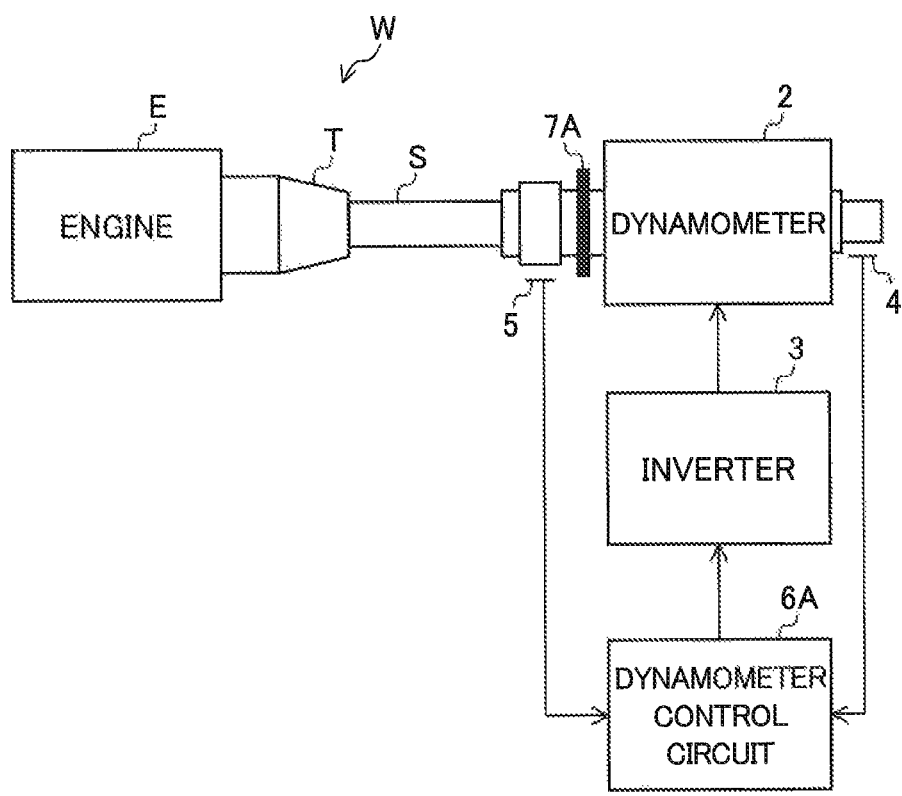
FIG. 5 is a schematic diagram illustrating the configuration of a drive train testing system according to a second embodiment of the invention.

FIG. 5 is a schematic diagram illustrating the configuration of the testing system 1A of the embodiment. In the following description of the testing system 1A, the same reference numerals will be given to the same components as the testing system 1 of the first embodiment, and a detailed description thereof will be omitted. The testing system 1A is different from the testing system 1 of the first embodiment in that a braking device 7A decelerating the rotation of the propeller shaft S is further provided and the dynamometer control circuit 6A has a different configuration.

The braking device 7A decelerates the rotation of the propeller shaft S by clamping a brake rotor provided in the dynamometer 2 side of the propeller shaft S using a brake caliper (not shown).

Figure 6:
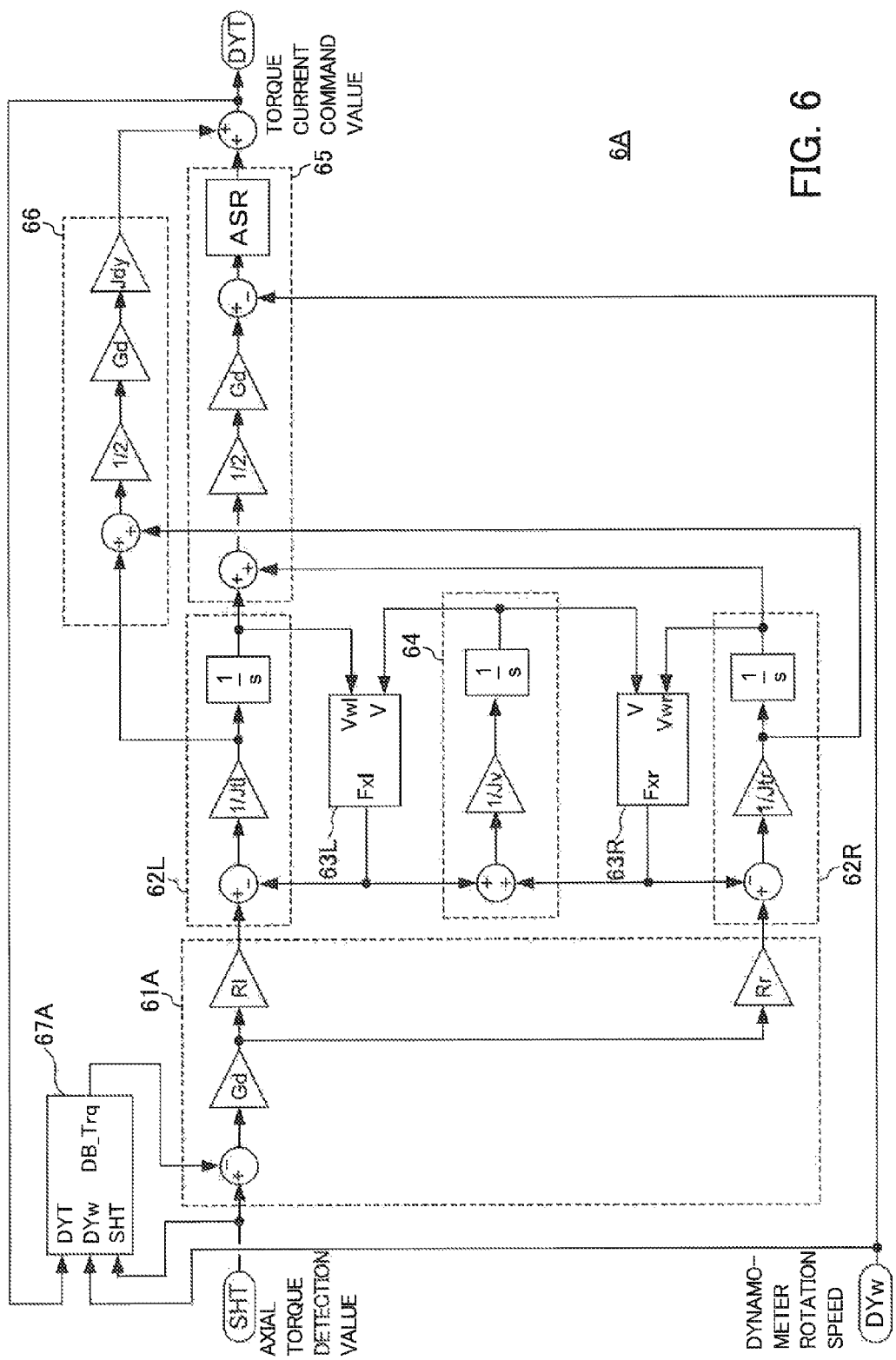
FIG. 6 is a block diagram illustrating the configuration of a dynamometer control circuit according to the above-described embodiment.

FIG. 6 is a block diagram illustrating the configuration of the dynamometer control circuit 6A.

The dynamometer control circuit 6A is different from the testing system 1 of the first embodiment in that a decelerating torque calculation unit 67A is further provided and the differential torque calculation unit 61A has a different configuration.

Figure 7:
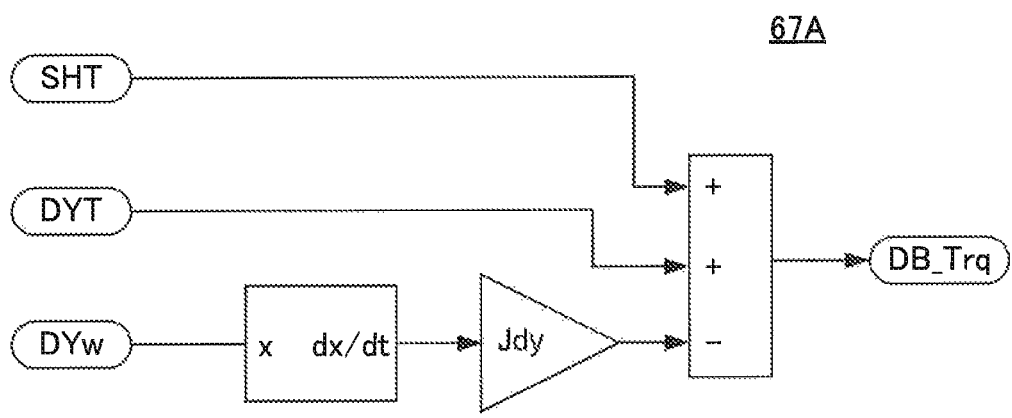
FIG. 7 is a block diagram illustrating a calculation procedure of a decelerating torque calculation unit.

FIG. 7 is a block diagram illustrating a calculation procedure of the decelerating torque calculation unit 67A.

The decelerating torque calculation unit 67A calculates a decelerating torque value DB_Trq by the braking device provided in the dynamometer side of the propeller shaft S based on the detection value SHT of the axial torque meter, a detection value DYw of the encoder, and a torque current command signal DYT. More specifically, the decelerating torque calculation unit 67A calculates a decelerating torque value DB_Trq using a motion equation of a dynamometer having an inertia moment Jdy based on the values SHT, DYw, and DYT as input (see the following equation (12)).

$$Jdy \cdot dDYw/dt = SHT + DYT - DB\_Trq \quad (12)$$

Returning to FIG. 6, the differential torque calculation unit 61A calculates the left differential torque value Tdl by multiplying the gear ratio Gd and the left torque distribution ratio Rl by a value obtained by subtracting the decelerating torque value DB_Trq of the braking device from the detection value SHT of the axial torque meter (see the following equation (13)). Furthermore, the differential torque calculation unit 61A calculates the right differential torque value Tdr by multiplying the gear ratio Gd and the right torque distribution ratio Rr by a value obtained by subtracting the decelerating torque value DB_Trq of the braking device from the detection value SHT of the axial torque meter (see the following equation (14)).

$$Tdl = (SHT - DB\_Trq) \times Gd \times Rl \quad (13)$$

$$Tdr = (SHT - DB\_Trq) \times Gd \times Rr \quad (14)$$

According to the testing system 1A of the embodiment, the following effect (D) is obtained in addition to the above-described effects (A) to (C).

(D) In the testing system 1A, the braking device 7A is provided so as to decelerate the rotation of the propeller shaft S of the test piece W and the decelerating torque value DB_Trq generated by the operation of the braking device 7A is estimated based on the detection value SHT of the axial torque meter, the detection value DYw of the encoder, and the torque current command signal DYT to the inverter. Accordingly, since it is possible to reproduce a behavior during the operation of the braking device 7A in the traveling state, it is possible to further improve the reproducibility of the test.

Third Embodiment

A drive train testing system 1B according to a third embodiment of the invention will be described with reference to the drawings.

Figure 8:
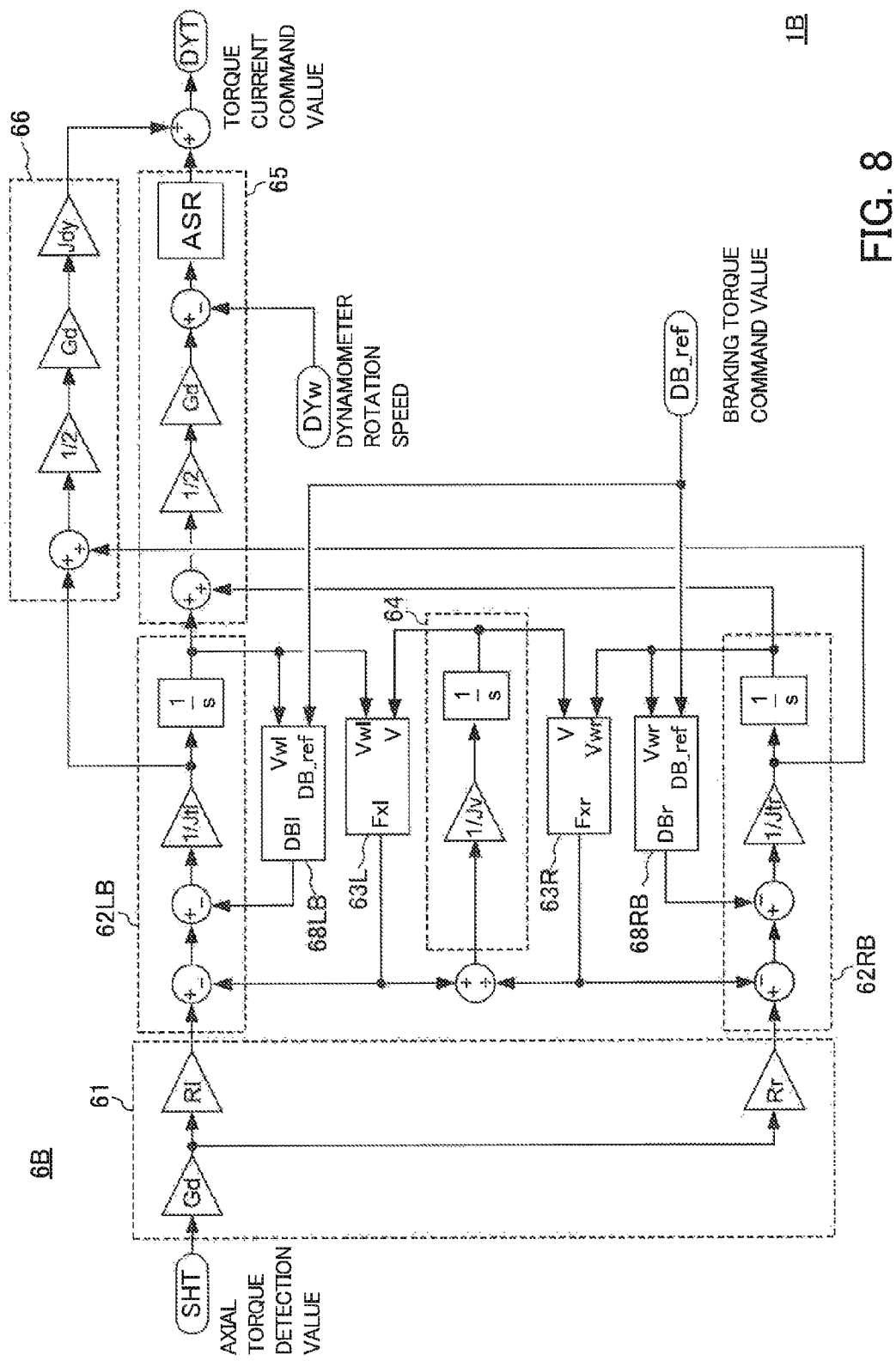
FIG. 8 is a schematic diagram illustrating the configuration of a drive train testing system according to a third embodiment of the invention.

FIG. 8 is a block diagram illustrating the configuration of a dynamometer control circuit 6B of the testing system 1B. In the following description of the testing system 1B, the same reference numerals will be given to the same components as the testing system 1 of the first embodiment, and the detailed description thereof will be omitted. The dynamometer control circuit 6B is different from the dynamometer control circuit 6 of FIG. 2 in that a left braking torque calculation unit 68LB and a right braking torque calculation unit 68RB are further provided and the left tire speed calculation unit 62LB and the right tire speed calculation unit 62RB have a different configuration.

The left braking torque calculation unit 68LB calculates a left braking torque value DBl generated by the operation of the virtual left braking device provided at the installation position of the left tire in the pair of output shafts of the virtual differential gear of the test piece.

Figure 9:
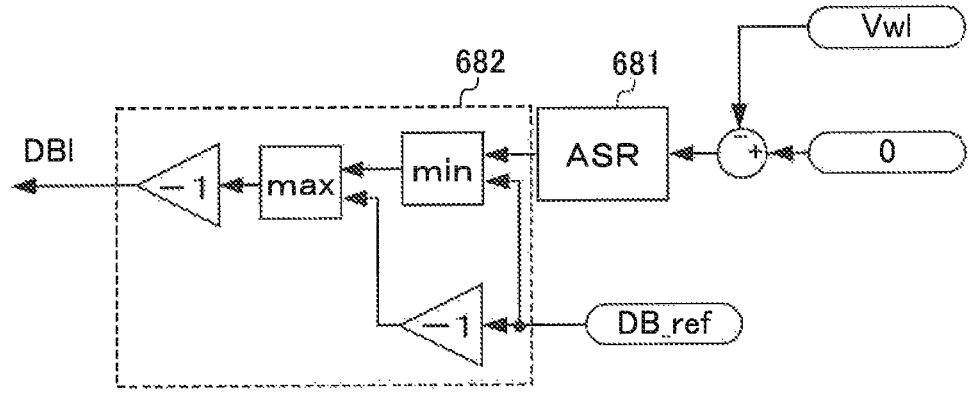
FIG. 9 is a block diagram illustrating a specific calculation procedure of a left braking torque calculation unit.

FIG. 9 is a block diagram illustrating a specific calculation procedure of the left braking torque calculation unit 68LB.

The left braking torque calculation unit 68LB includes a brake ASR 681 and a braking torque limiter 682, and calculates the left braking torque value DBl according to the following procedure.

The brake ASR 681 has the same function as the ASR of the speed control device 65, and calculates a braking torque value in which a deviation input value obtained by subtracting the left tire speed value Vwl from a predetermined stop target value (for example, 0) is 0.

The braking torque limiter 682 limits an output proportional to the braking torque value of the brake ASR 681 within a range in which a lower limit value is set to −DB_ref and an upper limit value is set to DB_ref when a positive braking torque command value DB_ref as the command value for the braking torque to be generated by the virtual left braking device is input from an external input device (not shown). In addition, in the combination shown in FIG. 9, the output of the brake ASR 681 is negative when the deviation input is positive. Here, the braking torque limiter 682 sets a value obtained by multiplying −1 by a value in which the output of the brake ASR 681 is limited within the range of −DB_ref to DB_ref as the left braking torque value DBl for the convenience of calculation.

Returning to FIG. 8, in the left braking torque calculation unit 68LB, the externally input braking torque command value DB_ref is treated as the upper limit value, and the left braking torque value DBl is calculated by the brake ASR 681 (see FIG. 9) so that the braking torque value is smaller than the upper limit value and the left tire speed value Vwl becomes the stop target value 0. In the right braking torque calculation unit 68RB, the externally input braking torque command value DB_ref is treated as the upper limit value, and the right braking torque value DBr is calculated by the brake ASR (not shown) so that the braking torque value is smaller than the upper limit value and the right tire speed value Vwr becomes the stop target value 0. In addition, since a specific calculation procedure of the right braking torque calculation unit 68RB is substantially similar to that of the left braking torque calculation unit 68LB, a more detailed description thereof will be omitted.

In the left tire speed calculation unit 62LB, a value obtained by subtracting the left vehicle driving torque value Fxl and the left braking torque value DBl from the left differential torque value Tdl is set as the tire driving torque value, and the left tire speed value Vwl is calculated by the left tire motion equation shown in the following equation (15) based on the tire driving torque value as input.

$$Tdl - DBl - Fxl = Jtl \cdot dVwl/dt \quad (15)$$

In the right tire speed calculation unit 62RB, a value obtained by subtracting the right vehicle driving torque value Fxr and the right braking torque value DBr from the right differential torque value Tdr is set as the tire driving torque value, and the right tire speed value Vwr is calculated by the right tire motion equation shown in the following equation (16) based on the tire driving torque value as input.

$$Tdr - DBr - Fxr = Jtr \cdot dVwr/dt \quad (16)$$

According to the testing system 1B of the embodiment, the following effect (E) is obtained in addition to the above-described effects (A) to (C).

(E) The left and right braking torque calculation units 68LB and 68RB respectively calculate the left and right braking torque values DBl and DBr respectively generated in the pair of output shafts of the virtual differential gear by the operation of the virtual braking device. The tire speed calculation units 62LB and 62RB calculate the tire speed values Vwl and Vwr based on a value obtained by subtracting the vehicle driving torque values Fxl and Fxr and the braking torque values DBl and DBr from the differential torque values Tdl and Tdr. Accordingly, it is possible to reproduce a behavior during the operation of the brake even when the test piece W is not provided with the mechanical braking device 7A differently from the testing system 1A of the second embodiment (see FIG. 5). Furthermore, in the testing system 1B, the braking torque calculation units 68LB and 68RB treat the predetermined braking torque command value DB_ref as the upper limit value without directly inputting the predetermined braking torque command value to the tire speed calculation units 62LB and 62RB. That is, the braking torque calculation units 68LB and 68RB set the braking torque command value DB_ref as the upper limit value, and calculate the braking torque values DBl and DBr so that the braking torque command value is smaller than the upper limit value and the left and right tire speed values Vwl and Vwr become 0. Accordingly, when the braking torque command value DB_ref is set to be large or small, it is possible to very precisely reproduce a behavior until the vehicle is stopped in the virtual traveling state when the brake is intensely or weakly operated even in the I-shaped testing system 1B. In other words, it is possible to reproduce a behavior when the traveling vehicle is stopped in a short time by the intense braking operation or a behavior when the traveling vehicle is stopped in a long time by the weak braking operation.

While the third embodiment of the invention has been described, the invention is not limited thereto.

Figure 10:
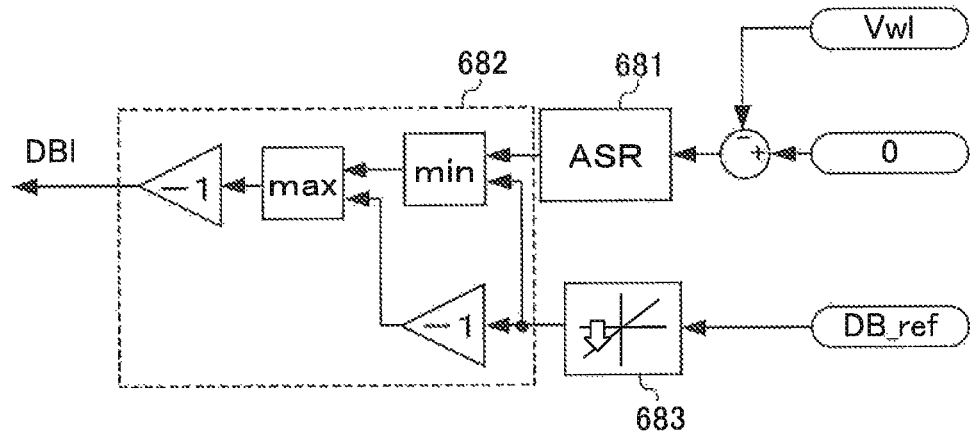
FIG. 10 is a block diagram illustrating a specific calculation procedure of a left braking torque calculation unit according to a modified example of the above-described embodiment.

For example, the calculation of the left braking torque calculation unit 68LB and the right braking torque calculation unit 68RB may be performed according to the procedure shown in FIG. 10.

FIG. 10 is a block diagram illustrating a specific calculation procedure of a left braking torque calculation unit 68LC according to a modified example of the third embodiment.

The left braking torque calculation unit 68LC is different from the left braking torque calculation unit 68LB shown in FIG. 9 in that a change rate limiting unit 683 that limits a change rate of the braking torque command value DB_ref is further provided. The change rate limiting unit 683 limits the braking torque command value DB_ref input from the external input device at a predetermined change rate [Nm/sec] or less. That is, when the braking torque command value DB_ref is changed in a step shape, the braking torque command value is changed at a predetermined change rate or less.

In the left braking torque calculation unit 68LC, the limited braking torque command value DB_ref_r is set as the upper limit value by the change rate limiting unit 683 and the left braking torque value DBl is calculated so that the left braking torque value is smaller than the upper limit value and the left tire speed value Vwl becomes 0 as described above with reference to FIG. 9.

According to the modified example, the following effect (F) is obtained in addition to the effects (A) to (C) and (E).

(F) The braking torque calculation unit 68LC limits the braking torque command value DB_ref at a predetermined change rate or less. Then, the braking torque value is calculated so that the braking torque value is smaller than the limited braking torque value as the upper limit value and the tire speed value Vwl becomes 0. Accordingly, when the change rate is set to be large or small, it is possible to very precisely reproduce a behavior until the vehicle is stopped in the virtual traveling state when the braking device is suddenly and intensely operated or is smoothly operated.

EXPLANATION OF REFERENCE NUMERALS 1, 1A, 1B . . . testing system
2 . . . dynamometer
3 . . . inverter
4 . . . encoder (speed detector)
5 . . . axial torque meter (axial torque detector)
61, 61A . . . differential torque calculation unit
62L, 62R, 62LB, 62RB . . . tire speed calculation unit
63L, 63R . . . vehicle driving torque calculation unit
64 . . . vehicle speed calculation unit
65 . . . speed control device
67A . . . decelerating torque calculation unit
68LB, 68LC . . . left braking torque calculation unit (first braking torque calculation unit)
68RB . . . right braking torque calculation unit (second braking torque calculation unit)
7A . . . braking device (braking device)

The invention claimed is:

1. A drive train testing system comprising:
a dynamometer that is connected to an output shaft of a test piece;
an inverter that supplies electric power in response to a command signal to the dynamometer;
an axial torque detector that detects an axial torque acting on the output shaft;
a speed detector that detects a rotation speed of the dynamometer;
a tire speed calculation unit that calculates speed values of first and second tires respectively connected to a pair of output shafts of a virtual differential device connected to the output shaft of the test piece;
a vehicle speed calculation unit that calculates a speed value of a virtual vehicle traveling by using the first and second tires as drive wheels;
a vehicle driving torque calculation unit that calculates a first vehicle driving torque value generated by a friction force between the first tire and a virtual first road surface and a second vehicle driving torque value generated by a friction force between the second tire and a virtual second road surface based on the first and second tire speed values and the vehicle speed value;
a differential torque calculation unit that calculates a first differential torque value and a second differential torque value generated in the pair of output shafts of the differential device based on a detection value of the axial torque detector; and
a speed control device that outputs a command signal so that a deviation between a detection value of the speed detector and a speed command value calculated based on the first and second tire speed values disappears,
wherein the tire speed calculation unit calculates the first tire speed value based on the first differential torque value and the first vehicle driving torque value and calculates the second tire speed value based on the second differential torque value and the second vehicle driving torque value.

2. The drive train testing system according to claim 1, wherein the differential torque calculation unit calculates the first differential torque value and the second differential torque value by multiplying the detection value of the axial torque detector by a predetermined first torque distribution ratio and a second torque distribution ratio so as to simulate a torque distribution function of the differential device.

3. The drive train testing system according to claim 2, wherein the differential torque calculation unit calculates the first differential torque value by multiplying the detection value of the axial torque detector by the first torque distribution ratio and a predetermined gear ratio of the differential device, and calculates the second differential torque value by multiplying the detection value of the axial torque detector by the second torque distribution ratio and the gear ratio.

4. The drive train testing system according to claim 3, wherein the speed control device sets a value obtained by multiplying an average value of the first tire speed value and the second tire speed value by a predetermined gear ratio of the differential device as a speed command value.

5. The drive train testing system according to claim 4, further comprising:
a braking device that decelerates a rotation of the output shaft of the test piece; and
a decelerating torque calculation unit that calculates a decelerating torque value of the output shaft based on the detection value of the axial torque detector, the detection value of the speed detector, and a value of a command signal to the inverter.

6. The drive train testing system according to claim 3, further comprising:
a braking device that decelerates a rotation of the output shaft of the test piece; and
a decelerating torque calculation unit that calculates a decelerating torque value of the output shaft based on the detection value of the axial torque detector, the detection value of the speed detector, and a value of a command signal to the inverter.

7. The drive train testing system according to claim 3, further comprising:
a first braking calculation unit that calculates a first braking torque value generated in the first tire side of the output shaft in the differential device by a virtual braking device; and
a second braking torque calculation unit that calculates a second braking torque value generated in the second tire side of the output shaft in the differential device by the braking device,
wherein the tire speed calculation unit calculates the first tire speed value based on a value obtained by subtracting the first vehicle driving torque value and the first braking torque value from the first differential torque value, and calculates the second tire speed value based on a value obtained by subtracting the second vehicle driving torque value and the second braking torque value from the second differential torque value,
wherein the first braking torque calculation unit sets a predetermined braking torque command value as an upper limit value, and calculates the first braking torque value so that the first braking torque value is smaller than the upper limit value and the first tire speed value becomes 0, and
wherein the second braking torque calculation unit sets a predetermined braking torque command value as an upper limit value, and calculates the second braking torque value so that the second braking torque value is smaller than the upper limit value and the second tire speed value becomes 0.

8. The drive train testing system according to claim 7, wherein the first braking torque calculation unit limits the braking torque command value at a predetermined change rate or less, sets the limited first braking torque value as an upper limit value, and calculates the first braking torque value so that the first braking torque value is smaller than the upper limit value and the first tire speed value becomes 0, and
wherein the second braking torque calculation unit limits the braking torque command value at a predetermined change rate or less, sets the limited second braking torque value as an upper limit value, and calculates the second braking torque value so that the second braking torque value is smaller than the upper limit value and the second tire speed value becomes 0.

9. The drive train testing system according to claim 2, wherein the speed control device sets a value obtained by multiplying an average value of the first tire speed value and the second tire speed value by a predetermined gear ratio of the differential device as a speed command value.

10. The drive train testing system according to claim 9, further comprising:
a braking device that decelerates a rotation of the output shaft of the test piece; and
a decelerating torque calculation unit that calculates a decelerating torque value of the output shaft based on the detection value of the axial torque detector, the detection value of the speed detector, and a value of a command signal to the inverter.

11. The drive train testing system according to claim 2, further comprising:
a braking device that decelerates a rotation of the output shaft of the test piece; and
a decelerating torque calculation unit that calculates a decelerating torque value of the output shaft based on the detection value of the axial torque detector, the detection value of the speed detector, and a value of a command signal to the inverter.

12. The drive train testing system according to claim 2, further comprising:
a first braking torque calculation unit that calculates a first braking torque value generated in the first tire side of the output shaft in the differential device by a virtual braking device; and
a second braking torque calculation unit that calculates a second braking torque value generated in the second tire side of the output shaft in the differential device by the braking device,
wherein the tire speed calculation unit calculates the first tire speed value based on a value obtained by subtracting the first vehicle driving torque value and the first braking torque value from the first differential torque value, and calculates the second tire speed value based on a value obtained by subtracting the second vehicle driving torque value and the second braking torque value from the second differential torque value, wherein the first braking torque calculation unit sets a predetermined braking torque command value as an upper limit value, and calculates the first braking torque value so that the first braking torque value is smaller than the upper limit value and the first tire speed value becomes 0, and wherein the second braking torque calculation unit sets a predetermined braking torque command value as an upper limit value, and calculates the second braking torque value so that the second braking torque value is smaller than the upper limit value and the second tire speed value becomes 0.

13. The drive train testing system according to claim 12, wherein the first braking torque calculation unit limits the braking torque command value at a predetermined change rate or less, sets the limited first braking torque value as an upper limit value, and calculates the first braking torque value so that the first braking torque value is smaller than the upper limit value and the first tire speed value becomes 0, and wherein the second braking torque calculation unit limits the braking torque command value at a predetermined change rate or less, sets the limited second braking torque value as an upper limit value, and calculates the second braking torque value so that the second braking torque value is smaller than the upper limit value and the second tire speed value becomes 0.

14. The drive train testing system according to claim 1, wherein the speed control device sets a value obtained by multiplying an average value of the first tire speed value and the second tire speed value by a predetermined gear ratio of the differential device as a speed command value.

15. The drive train testing system according to claim 14, further comprising:
    a braking device that decelerates a rotation of the output shaft of the test piece; and
    a decelerating torque calculation unit that calculates a decelerating torque value of the output shaft based on the detection value of the axial torque detector, the detection value of the speed detector, and a value of a command signal to the inverter.

16. The drive train testing system according to claim 1, further comprising:
    a braking device that decelerates a rotation of the output shaft of the test piece; and
    a decelerating torque calculation unit that calculates a decelerating torque value of the output shaft based on the detection value of the axial torque detector, the detection value of the speed detector, and a value of a command signal to the inverter.

17. The drive train testing system according to claim 1, further comprising:
    a first braking torque calculation unit that calculates a first braking torque value generated in the first tire side of the output shaft in the differential device by a virtual braking device; and
    a second braking torque calculation unit that calculates a second braking torque value generated in the second tire side of the output shaft in the differential device by the braking device, wherein the tire speed calculation unit calculates the first tire speed value based on a value obtained by subtracting the first vehicle driving torque value and the first braking torque value from the first differential torque value, and calculates the second tire speed value based on a value obtained by subtracting the second vehicle driving torque value and the second braking torque value from the second differential torque value, wherein the first braking torque calculation unit sets a predetermined braking torque command value as an upper limit value, and calculates the first braking torque value so that the first braking torque value is smaller than the upper limit value and the first tire speed value becomes 0, and wherein the second braking torque calculation unit sets a predetermined braking torque command value as an upper limit value, and calculates the second braking torque value so that the second braking torque value is smaller than the upper limit value and the second tire speed value becomes 0.

18. The drive train testing system according to claim 17, wherein the first braking torque calculation unit limits the braking torque command value at a predetermined change rate or less, sets the limited first braking torque value as an upper limit value, and calculates the first braking torque value so that the first braking torque value is smaller than the upper limit value and the first tire speed value becomes 0, and wherein the second braking torque calculation unit limits the braking torque command value at a predetermined change rate or less, sets the limited second braking torque value as an upper limit value, and calculates the second braking torque value so that the second braking torque value is smaller than the upper limit value and the second tire speed value becomes 0.

* * * * *